3,005,254
BRAZED ZIRCONIUM BASE ALLOY STRUCTURES
Donald E. Thomas, Pittsburgh, Pa., assignor to Westinghouse Electric Corporation, East Pittsburgh, Pa., a corporation of Pennsylvania
No Drawing. Filed May 29, 1958, Ser. No. 738,628
5 Claims. (Cl. 29—194)

This invention relates to brazed structures comprising zirconium base alloy members and brazed metal bonding the members into strong, corrosion-resistant unitary devices.

In fabricating zirconium base alloy structures comprising members of zirconium base alloy for use in high temperature water and steam, it has been found that numerous known brazing metals are not satisfactory brazing materials therefor. The brazing material may result in a weak bond in many cases. However, many brazing metals tested for such applications have proven to be highly deficient in corrosion resistance in the presence of high temperature water and steam. It has been highly desirable to have available satisfactory brazing materials which can be used in the fabrication of brazed structures.

As set forth in Patent 2,772,964 in which the inventor of the present invention was a co-inventor, said patent being assigned to the assignee of the present invention, certain highly corrosion-resistant zirconium base alloys are available for use in high temperature water and steam. These alloys consist essentially of from 0.1% to 2.5% by weight of tin, a total of at least 0.1%, but not exceeding 2% by weight of at least one metal from period 3 (and particularly series 4) of the periodic table selected from the group consisting of iron, nickel and chromium, less than 0.5% by weight of incidental impurities, and the balance being zirconium. The alloys will function satisfactorily even when containing relatively large amounts of such impurities as nitrogen, oxygen, and carbon. These alloys, in particular, require specially prepared braze alloys in order to prepare structures that will not corrode excessively at the brazed joints so that there are produced brazed structures that will have a relatively uniform corrosion resistance throughout. Furthermore, the braze alloys must produce structures that will exhibit high tensile strengths and good ductility at the joints.

The requirements for the brazing alloy to be applied to zirconium base alloy members include further that it have excellent flow properties so that the molten braze material wil flow for considerabe distances along the brazed joint. Further, the brazing alloy must melt below the melting point of the zirconium base alloy to which it is applied and yet not dissolve any substantial part of the structural material to which it is applied. An additional requirement is that no flux be employed in producing the brazing joint. Other required characteristics will be disclosed hereinafter.

The object of the present invention is to provide a brazed structure embodying as the brazing material a zirconium base alloy containing from 1% to 10% beryllium and preferably approximately 5% beryllium.

A further object of the invention is to provide a process for brazing zirconium base members into a unitary structure by appying thereto a zirconium base brazing alloy composed of from 1% to 10% beryllium, not over 5% added alloying components and the balance, at least 85%, being zirconium, said alloy having a melting point of approximately 1000° C. and forming a well-bonded joint without the use of a flux.

Other objects of the invention will, in part, be obvious and will, in part, appear hereinafter. For a better understanding of the nature and objects of this invention, reference should be had to the following detailed description.

In accordance with the present invention, it has been discovered that outstanding brazed structures embodying members of zirconium base alloys may be prepared by applying thereto a zirconium base alloy containing from 1% to 10% beryllium, and preferably from 4% to 6% beryllium. These structures may be readily prepared without the use of any flux in the brazing operation.

More particularly, various zirconium base alloys and, in particular, members of zirconium base alloy consisting essentially of from 0.1% to 2.5% by weight of tin, a total of at least 0.1% and not exceeding approximately 2% by weight of at least one metal selected from the group consisting of iron, nickel and chromium, less than 0.5% by weight of incidental impurities, and the balance being zirconium, are brazed by applying thereto a zirconium-beryllium alloy between surfaces of the members to be brazed and subjecting the assembly to a temperature of slightly above 1000° C. while the assembly is subjected to a non-reactive atmosphere. By a non-reactive atmosphere, there is included either totally inert gases, such as helium or argon, or mixtures thereof, or a high vacuum of the order of 1 micron and lower absolute pressure. Care should be taken that the gas be treated to remove traces of oxygen, nitrogen and water vapor.

The brazing alloy may be prepared by melting the previously prepared zirconium base alloy corresponding to the alloy used for the members themselves and then adding the desired amount of beryllium thereto. The melting must be carried out in a non-reactive atmosphere, for example, a vacuum or helium. Arc melting procedures have given good results in preparing the alloy. When 4% and higher proportions of beryllium are present, the resulting melt, when cooled, results in ingots that are quite brittle and cannot be worked into the wire or sheets by conventional means. However, for brazing purposes, the ingots can be readily broken up and crushed to granules or powders sufficiently fine to be disposed at the surfaces to be brazed.

The zirconium base alloy members to be brazed into a unitary structure must be cleaned at the surfaces to be joined. While mechanical abrasion or other cleaning procedures may be employed, chemical etching of the surfaces has given good results in practice. A solution comprising a mixture, by volume, of 5% of 48% hydrofluoric acid solution, 35% of concentrated nitric acid, and the balance being water, has proven to give good results. The surfaces to be brazed are treated with the solution, either by immersion therein or by flowing the solution thereover until all surface films are removed. The cleaned surfaces are coated with a thin layer of the powdered zirconium-beryllium brazing alloy and superimposed. Clamping means may be required to maintain the members in desired position. The assembly is then placed within a heating chamber, the chamber is then evacuated to less than 1 micron absolute pressure, and helium gas which is purified by passing it over titanium sponge at a temperature of, for example, 900° C. is admitted to the chamber. A suitable means for heating the members at the joints to be brazed comprises an induction coil encircling the member. However, other heating means may be employed to heat the area at the joint to a temperature above 1000° C. A 5% beryllium-95% zirconium base alloy has a melting point of approximately 970° C. A temperature slightly above 1000° C. will cause the applied brazing alloy to melt and flow along the space between the superimposed members. The alloy will attack a thin layer of the surfaces of the members with which it comes in contact. The temperature may then be reduced and the molten brazing alloy will solidify, thereby forming an excellent brazed joint. In some cases, spacers of molybdenum or other relatively non-reactive metals may be employed in order to secure precise dimensions in the resulting brazed structure.

The following example is illustrative of the practice of the invention.

Example I

Pellets of a zirconium base alloy comprising approximately 1.5% tin, 0.1% chromium, 0.07% nickel, 0.12% iron, carbon not exceeding 0.05%, less than 0.4% incidental impurities, and the balance zirconium, were admixed with 5% beryllium, based on the weight of the zirconium base alloy pellets. This mixture was melted using a non-consumable electrode in a water-cooled copper crucible employing a helium atmosphere. The resulting ingot was then mechanically pulverized into a fine powder in which the particles were finer than 100 mesh. Flat strips, 1 inch wide, were prepared from a zirconium base alloy of a composition similar to that employed for the pellets of the brazing alloy, excluding, of course, the beryllium. These strips were cleaned by immersing them in an etchant comprising 5% by volume of 48% hydrofluoric acid solution, 35% by volume of concentrated nitric acid and the balance being water. The etchant was applied for a period of time sufficient to remove several mils of metal from the surfaces. Two of the cleaned strips were coated with a thin layer of the powdered brazing alloy and clamped together to produce a single lap joint approximately ½ to ¾ inch in length. In some of the lap joints so made, molybdenum spacer strips of a thickness of 0.003 inch were placed between the overlapping strips. The members so produced were disposed within an induction coil located inside of a hermetically sealed chamber. The chamber was evacuated to an absolute pressure of approximately 0.1 micron. Thereafter, purified helium was admitted to the chamber until approximately 1 atmosphere pressure was obtained in the chamber. The helium was purified by passing it over titanium sponge heated to a temperature of approximately 900° C. Thereafter, the induction coil was energized whereby to heat the lap joint to a temperature of approximately 1100° C. for a period of time of approximately 1 minute. When the flow of the brazing alloy was evident at the joint, the induction coil was deenergized, and the assembly was permitted to cool to approximately room temperature before it was removed from the chamber.

The resulting brazed structures were tested for corrosion in high temperature water at 680° F. After 1200 hours in hot water, the brazed structures were examined. In no case was there evident any corrosion at the joint different from the corrosion of the brazed members themselves. Microscopic examination of the joint and the adjacent metal showed no preferential attack at that point. Other samples were subjected to tensile tests. These tests gave sheer strength values of 55,000 p.s.i. and tensile strengths of from 36,000 to 40,000 p.s.i. Such brazed joints exceeded by a factor of almost 2 the sheer stresses obtained with any other brazing material tested among a great number that had been employed in preparing similar brazed zirconium base alloy members.

The brazing alloys may be prepared by combining beryllium to produce the following alloy, tin 0.25% by weight, iron 0.25% by weight, beryllium 6% by weight, the balance zirconium except for incidental impurities.

The process of Example I was repeated using, however, argon gas as the protective atmosphere during brazing. Good results were obtained with the argon gas. In no case was it necessary to employ any flux, and good weld-bonded, brazed joints were obtained regularly.

It will be understood that the brazing alloy of the present invention may be applied to essentially pure zirconium metal, as well as zirconium metal alloys containing up to 10% of various additives. Thus, the zirconium base members to be brazed may comprise an alloy containing up to 2½% tin from 0.1% to 2% of at least one metal from the group consisting of iron, nickel and chromium, up to 0.7% beryllium, and the balance being zirconium except for incidental impurities not exceeding 0.5%.

It will be understood that the above description is illustrative and not limiting.

I claim as my invention:

1. A brazed structure comprising two zirconium base alloy members having surfaces disposed close to one another, and a layer of brazing alloy disposed between and bonded to both surfaces, the alloy comprising from 0.1% to 2.5% tin, from 0.1% to 2% by weight of at least one metal selected from the group consisting of iron, nickel and chromium, from 1% to 10% beryllium and the balance being zirconium and not in excess of 0.5% of impurities.

2. A brazed structure comprising two zirconium base alloy members having surfaces disposed close to one another, at least one of the members composed of from 0.1% to 2.5% tin, from 0.1% to 2% by weight of at least one metal from the group consisting of iron, nickel and chromium, the balance being zirconium and not in excess of 0.5% of impurities, and a layer of brazing alloy disposed between and bonded to both surfaces, the alloy comprising from 0.1% to 2.5% tin, from 0.1% to 2% by weight of at least one metal selected from the group consisting of iron, nickel and chromium, from 1% to 10% beryllium and the balance being zirconium and not in excess of 0.5% of impurities.

3. A brazed structure comprising two zirconium base alloy members having surfaces disposed close to one another, and a layer of brazing alloy disposed between and bonded to both surfaces, the alloy comprising from 0.1% to 2.5% tin, from 0.1% to 2% by weight of at least one metal selected from the group consisting of iron, nickel and chromium, approximately 5% beryllium and the balance being zirconium and not in excess of 0.5% of impurities.

4. A brazed structure comprising two zirconium base alloy members having surfaces disposed close to one another, at least one of the members composed of from 0.1% to 2.5% tin, from 0.1% to 2% by weight of at least one metal from the group consisting of iron, nickel and chromium, the balance being zirconium and not in excess of 0.5% of impurities, and a layer of brazing alloy disposed between and bonded to both surfaces, the alloy comprising from 0.1% to 2.5% tin, from 0.1% to 2% by weight of at least one metal selected from the group consisting of iron, nickel and chromium, approximately 5% beryllium and the balance being zirconium and not in excess of 0.5% of impurities.

5. A brazed structure comprising two zirconium base alloy members having surfaces disposed close to one another, at least one of the members composed of from 0.1% to 2.5% tin, from 0.1% to 2% by weight of at least one metal from the group consisting of iron, nickel and chromium, the balance being zirconium and not in excess of 0.5% of impurities, and a layer of brazing alloy disposed between and bonded to the surfaces of both members, the alloy composed of from 1.3% to 1.6% by weight of tin, from 0.07% to 0.12% by weight of chromium, from 0.04% to 0.08% by weight of nickel, from 0.09% to 0.16% by weight of iron, from 4% to 6% by weight of beryllium, less than 0.5% of incidental impurities and the balance being zirconium, the brazed structure having a high resistance to corrosion in hot water and steam, and having a high strength.

References Cited in the file of this patent

UNITED STATES PATENTS 2,798,843 Slomin _____ July 9, 1957
2,857,663 Beggs _____ Oct. 28, 1958

OTHER REFERENCES

Facts About Zirconium, pub. by Carborundum Co., Akron, Ohio, pp. 40 and 41, copyright May 1954.

Zirconium-Beryllium System Transactions AIME, vol. 188, January 1950, Journal of Metals, pp. 59–66.